United States Patent Office 2,733,232
Patented Jan. 31, 1956

2,733,232

MANUFACTURE OF FREE-FLOWING SOLID SALTS OF ALKENYL AROMATIC RESIN SULFONIC ACIDS

William C. Bauman, Midland, Mich., assignor to The Dow Chemical Company, Midland, Mich., a corporation of Delaware No Drawing. Application May 23, 1952, Serial No. 289,659

14 Claims. (Cl. 260—79.3)

This invention concerns an improved method for the production of salts of alkenyl aromatic resin sulfonic acids in the form of free-flowing solid granules. It pertains especially to a procedure for converting the solid granular, water-soluble resin sulfonic acids directly into solid, granular, water-soluble salts, particularly sodium or potassium salts, of the same.

The alkenyl aromatic resins which are used in making resin sulfonic acid salts in accordance with the invention are solid, benzene-soluble polymers of vinylidene compounds, which polymers contain, in chemically combined form, 50 per cent by weight or more of at least one alkenyl aromatic compound having the general formula:

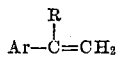

wherein Ar represents a monovalent aromatic radical and R is hydrogen or the methyl radical. They are usually of molecular weights ranging from 30,000 to 150,000 as determined by the well known Staudinger viscosity method, but may be of lower or higher molecular weights. Many such alkenyl aromatic resins are known. Examples of the resins are the solid polymers of styrene, ar-vinyltoluene, ar-chlorostyrene, ar-ethylvinylbenzene, alpha-methylstyrene, alpha-methyl-ar-methylstyrene; solid copolymers of any two or more of such compounds with one another, e.g. copolymers of styrene and alpha-methylstyrene, of styrene and ar-methylstyrene, and of styrene and ar-chlorostyrene; and solid copolymers of one or more of the alkenyl aromatic compounds with a minor amount of other polymerizable mono-olefinic compounds such as butenes, pentenes, or hexenes, etc.

It is known that such alkenyl aromatic resins may be reacted with sulfonating agents such as concentrated sulfuric acid, fuming sulfuric acid, chlorosulfonic acid, sulfur trioxide, or complexes of sulfur trioxide with ethers such as dioxane or bis-(beta-chloroethyl) ether, to form corresponding resin sulfonic acids, but that the reaction temperatures required and the properties of the products vary with changes in the kind of sulfonating agent employed, the extent of the sulfonation reaction, and the reaction conditions used. For instance, the resin sulfonic acids may be water-insoluble or may be water-soluble, e.g. to form true or colloidal solutions, depending on the extent of the sulfonation reaction and the reaction conditions used. In general, the water-soluble alkenyl aromatic resin sulfonic acids contain an average of at least 0.55, usually from 0.6 to 1.7, sulfonic acid radicals per aromatic nucleus. Also, the resin sulfonic acids may be obtained in the form of swollen masses which have sulfuric acid or unreacted sulfonating agents absorbed therein, or in the form of small hard granules depending on the reaction conditions used. Methods for making resin sulfonic acids in all of these several forms are known in the art.

This invention pertains especially to a method whereby the finely divided, or granular, water-soluble alkenyl aromatic resin sulfonic acids can be converted directly into granular salts thereof.

As indicated above, the sulfonation reaction to form a water-soluble material produces the latter as an alkenyl aromatic resin sulfonic acid, whereas a salt of such acid is often desired, e.g. as a sizing agent. Heretofore, it has been customary, in forming salts of such products, to dissolve the crude resin sulfonic acid in a large volume of water, neutralize the solution by treatment with an alkali such as sodium hydroxide or potassium hydroxide, and heat the resulting solution to evaporate the water therefrom and obtain the salt of the resin sulfonic acid as residue. These operations are inconvenient, time-consuming and add considerably to the cost of the product. It is an object of this invention to obviate such steps and convert the granular alkenyl aromatic resin sulfonic acids directly into solid, granular salts thereof. Other objects will be evident from the following description of the invention.

Although methods for obtaining the water-soluble alkenyl aromatic resin sulfonic acids in granular form are known, and this invention is not restricted to any particular procedure for making such granular material, it may be mentioned that the granular water-soluble resin sulfonic acids are prepared by admixing a highly reactive sulfonating agent such as chlorosulfonic acid, sulfur trioxide, or one of the aforementioned ether-complexes of sulfur trioxide with a solution of the alkenyl aromatic resin in an organic liquid which is less reactive than the resin with the sulfonating agent while maintaining the mixture at low or moderate reaction temperatures, e.g. at temperatures between —20° and +40° C. Liquid polychlorinated aliphatic hydrocarbons such as carbon tetrachloride, tetrachloroethylene, or ethylene chloride, etc. are usually employed as the reaction media. During the reaction which takes place, the alkenyl aromatic resin sulfonic acid is formed and precipitated as a finely divided, e.g. granular, material. U. S. Patents 2,533,210 and 2,533,211 describe in detail certain ways for carrying out the reaction to obtain the finely divided resin sulfonic acid.

I have found that by treating the granular resin sulfonic acid with a liquid aqueous solution of a highly ionized basic metal compound in a concentration containing not more than 160 grams of water per gram equivalent weight of the basic compound, the resin sulfonic acid can be converted directly to a solid salt thereof with concurrent absorption of the water by the salt and resultant production of the salt as solid, free-flowing granules or particles suitable for marketing. By a "gram equivalent weight" of a basic compound is meant the grams of the compound required to neutralize one gram molecular weight of hydrochloric acid. Thus, one gram molecular weight of sodium carbonate contains two gram equivalent weights of the compound.

It is important that the alkaline compound be highly ionized and that it be in a concentration as high as just stated. When a small portion of water alone, or of an aqueous solution of a weak alkali such as ammonia, is added to a powdered water-soluble resin sulfonic acid, it is rapidly absorbed by a portion of the resin sulfonic acid to form gummy, or rubbery, balls and the remaining powdered resin sulfonic acid is apparently not wetted by the liquid. This happens even when using an aqueous ammonia solution of a concentration as great as that stated above. A similar occurrence takes place upon adding to a powdered resin sulfonic acid an aqueous solution of a strong, i. e. highly ionized, alkali in a concentration appreciably lower than that required by the invention. However, an aqueous solution of a strong alkali which contains not more than 160 grams of water per gram equivalent weight of the alkali is absorbed more slowly by the powdered resin sulfonic acid so that there is ample time for thoroughly and intimately admixing the alkali solution with the resin sulfonic acid before absorption of the solution and neutralization of the resin sulfonic acid takes place. As a result the resin sulfonic acid which is being neutralized remains in a granular or powdered form instead of becoming agglomerated.

Any strongly alkaline compound which can be dissolved in water to form an aqueous solution containing not more than 160 grams of water per chemical equivalent of the alkali can be used in the process of the invention, but many alkaline compounds, e. g. lime, barium hydroxide, and sodium bicarbonate, etc., are not sufficiently soluble for such use. Examples of alkaline compounds that can be used are sodium hydroxide, potassium hydroxide, sodium carbonate, and potassium carbonate. A suitable sodium carbonate solution is usually prepared and employed at an elevated temperature, e. g. 70° C. or above, since the solubility of sodium carbonate in water is undesirably low at room temperature. The other alkaline compounds last mentioned are sufficiently soluble at room temperature for preparation of alkali solutions of suitable concentrations. A liquid aqueous solution of any of the hydroxides or normal carbonates of sodium and potassium contains sufficient water to permit ionization of the reactants and occurrence of the neutralization reaction. Accordingly, a lower limit as to the proportion of water which may be present in the aqueous alkali solution need not be stated.

The liquid aqueous alkali solution, containing not more than 160 grams of water per gram equivalent weight of the alkali, may be added gradually or rapidly to the powdered resin sulfonic acid or, alternatively, the resin sulfonic acid may be added rapidly to the alkali solution, but it is important that the mixture be stirred during, or promptly after, bringing the reactants together.

The aqueous alkali is preferably admixed with the resin sulfonic acid in the presence of an inert and water-immiscible organic liquid whch is not a solvent for the resin sulfonic acid or its salt. Examples of such organic liquids are benzene, chlorobenzene, toluene, ligroin, carbon tetrachloride, ethylene chloride, or tetrachloroethylene, etc. Thus, the aqueous alkali may advantageously be admixed directly with the slurry of the granular resin sulfonic acid and a liquid polychlorinated aliphatic hydrocarbon resulting from the sulfonation reaction. The alkali is preferably added in the amount required to neutralize the sulfonic acid, but it can be used in somewhat smaller or larger proportions, e. g. from 0.9 to 1.1 gram moles of the alkali may be used per gram equivalent weight of the resin sulfonic acid. After adding the aqueous alkali the mixture is stirred, usually for an hour or longer, while at room temperature or above, e. g. at temperatures of from 25° to 125° C. and preferably from 40° to 60° C. Thereafter, any organic liquid is removed, e. g. by being decanted or vaporized from the product.

As procedure alternative to that just described, the aqueous alkali solution may be admixed directly with approximately its chemical equivalent of the granular resin sulfonic acid in the absence of an organic liquid, or other medium, and the mixture be stirred for about an hour or longer while at room temperature or above.

The following examples describe certain ways in which the invention has been practiced, but are not limiting as to its scope.

EXAMPLE 1

A slurry of a finely-divided, water-soluble polystyrene sulfonic acid in methyl chloroform (which polystyrene sulfonic acid had been made and precipitated by reacting chlorosulfonic acid with a solution of polystyrene in methyl chloroform) was warmed to 50° C. An aqueous sodium hydroxide solution of 50 weight per cent concentration was added slowly and with stirring to the slurry until a sample of solids from the slurry, when dissolved in water, formed a solution having a pH value of 7. The mixture was filtered to remove the methyl chloroform. The small amount of methyl chloroform which adhered to the residual sodium polystyrene sulfonate was vaporized therefrom. The product was a white, finely divided, free-flowing sodium polystyrene sulfonate.

EXAMPLE 2

By repeating the procedure of Example 1, except that an aqueous potassium hydroxide solution of 50 weight per cent concentration is used as the alkali, a solid, water-soluble potassium polystyrene sulfonate is obtained as a white, finely divided, free-flowing material.

EXAMPLE 3

To 50 grams of a water-soluble polystyrene sulfonic acid in the form of a dry powder, there was added slowly, and with grinding of the mixture in a mortar, 10 grams of an aqueous sodium hydroxide solution of 50 weight per cent concentration. The mixture was maintained as a free-flowing powder by working it with a pestle. Periodically a sample of the mixture was withdrawn, dissolved in water, and the pH of the solution determined. It was found that the alkali had been added in amount greater than the chemical equivalent of the polystyrene sulfonic acid. Accordingly, a further amount of the powdered polystyrene sulfonic acid was added in small portions and worked into the mixture until a sample of the mixture, when dissolved in water, formed a solution having a pH value of 8.5. The substantially neutral sodium polystyrene sulfonate thus formed was a white, free-flowing powder.

EXAMPLE 4

In each of a series of experiments, a 10 gram portion of an air-dried resin sulfonic acid, in powdered form, was neutralized by gradually adding a liquid aqueous solution of the alkali named in the following table while stirring and grinding the mixture. The addition of alkali was continued until a portion of the mixture, when dissolved in water, formed a neutral, or nearly neutral, solution, i.e. a solution having a pH value in the range of from 5.8 to 10. The resin sulfonic acid which was employed in the experiments was a water-soluble sulphonated copolymer of equal parts by weight of styrene and ar-vinyltoluene. In all of the experiments the dry granular resin sulfonic acid was converted directly into an apparently dry, free-flowing white powder of a salt of the resin sulfonic acid. The table names the alkali that was used in each experiment and gives the grams of water per gram equivalent weight of the alkali in each aqueous alkali starting solution.

Table

| Run No. | Alkali Solution Employed | |
|---|---|---|
| | Alkali | gms. $H_2O$/ gm. Equ. Wt. of Alkali |
| 1 | NaOH | 157 |
| 2 | NaOH | 119 |
| 3 | $Na_2CO_3$ | 119 |
| 4 | $K_2CO_3$ | 69 |
| 5 | KOH | 56 |
| 6 | NaOH | 40 |

The sodium copolymer sulfonate obtained in run 1 of the table was an apparently dry, free-flowing powder, but had a spongy feel, i.e. a slight resilience, when pressed. Apparently, the proportion of water in the aqueous sodium hydroxide solution used in making this salt was close to the maximum that can be tolerated and obtain a satisfactory product.

I claim:

1. A method of making a finely divided, free-flowing salt of a water-soluble alkenyl aromatic resin sulfonic acid directly from the finely divided, solid resin sulfonic acid, which method comprises intimately admixing a liquid aqueous solution of a basic metal compound, which solution contains not more than 160 grams of water per gram equivalent weight of the basic compound, with an amount of the solid, finely divided alkenyl aromatic resin sulfonic acid corresponding approximately to the chemical equivalent of the basic compound.

2. A method, as claimed in claim 1, wherein the basic metal compound is sodium hydroxide.

3. A method, as claimed in claim 1, wherein the basic compound is sodium carbonate.

4. A method, as claimed in claim 1, wherein the basic compound is potassium hydroxide.

5. A method, as claimed in claim 1, wherein the basic metal compound is potassium carbonate.

6. A method, as claimed in claim 1, wherein the alkenyl aromatic resin sulfonic acid is polystyrene sulfonic acid.

7. A method, as claimed in claim 1, wherein the alkenyl aromatic resin sulfonic acid is a sulfonated copolymer of styrene and ar-vinyltoluene.

8. A method, as claimed in claim 1, wherein the alkenyl aromatic resin sulfonic acid is polystyrene sulfonic acid and the basic metal compound is sodium hydroxide.

9. A method, as claimed in claim 1, wherein the alkenyl aromatic resin sulfonic acid is polystyrene sulfonic acid and the basic metal compound is potassium hydroxide.

10. A method of making a finely-divided, free flowing solid salt of a water-soluble sulfonated alkenyl aromatic resin directly from the finely-divided solid resin sulfonic acid, which method comprises forming a slurry of the finely divided solid alkenyl aromatic resin sulfonic acid in a substantially inert organic liquid that is not a solvent for the alkenyl aromatic resin sulfonic acid and is not a solvent for the salt thereof to be formed, adding to the slurry a liquid aqueous solution of a basic metal compound, which solution contains not more than 160 grams of water per gram equivalent weight of the basic compound, said aqueous solution being added in a proportion containing approximately the amount of the basic compound theoretically required to neutralize the alkenyl aromatic resin sulfonic acid, stirring the resulting mixture and separating from the mixture the finely-divided solid salt which is formed.

11. A method as claimed in claim 10, wherein the basic metal compound is sodium hydroxide.

12. A method as claimed in claim 10, wherein the basic metal compound is sodium carbonate.

13. A method as claimed in claim 10, wherein the alkenyl aromatic resin sulfonic acid is sulfonated polystyrene.

14. A method as claimed in claim 10, wherein the alkenyl aromatic resin sulfonic acid is a sulfonated copolymer of styrene and ar-vinyltoluene.

References Cited in the file of this patent

UNITED STATES PATENTS

| | | |
|---|---|---|
| 2,533,211 | Baer | Dec. 12, 1950 |
| 2,607,762 | Bowen | Aug. 19, 1952 |